United States Patent Office 2,908,670
Patented Oct. 13, 1959

2,908,670

POLYMERIZATION OF HIGHER OLEFINS TO SOLID POLYMER WITH LITHIUM-TITANIUM TETRAHALIDE CATALYSTS

Hugh J. Hagemeyer, Jr., and Marvin B. Edwards, Longview, Tex., assignors to Eastman Kodak Company, Rochester, N.Y., a corporation of New Jersey No Drawing. Application November 1, 1956
Serial No. 619,672

10 Claims. (Cl. 260—93.7)

This invention relates to the polymerization of $\alpha$-monoolefins containing at least 3 carbon atoms and is particularly concerned with the catalytic polymerization of $\alpha$-monoolefins which are aliphatic in nature and which contain at least as many carbon atoms as propylene to give solid highly crystalline polymers using a catalyst mixture of specific composition which is unique in its stereospecificity and which is highly active under certain specific conditions as described hereinafter.

The lowest aliphatic monoolefin, ethylene, has been polymerized for a number of years to solid polymers of relatively low crystallinity and low density by means of very high pressure processes as described in Fawcett et al. 2,153,553 wherein pressures in excess of 500 atmospheres and usually of the order of 1000–2000 atmospheres have been employed to give solid waxy polymers having a crystallinity below about 85%. These high pressure processes, however, were not suitable for polymerizing such higher $\alpha$-monoolefins as propylene to solid polymer, and consequently the polymerization of higher olefins to usable plastics has lagged behind the polymerization of ethylene, even though it was recognized that potentially such higher polyolefins should have improved physical characteristics such as higher melting points and the like.

More recently, a number of methods have been proposed for preparing the so-called high density polyethylene having an increased softening temperature, greater stiffness and greater crystallinity by catalytic processes at relatively low pressures. Although a number of methods have been found for forming highly crystalline polyethylene, many of the proposed processes have been largely or wholly ineffective for polymerizing the higher $\alpha$-monoolefins such as propylene to solid polymer. Furthermore, of those few catalytic systems which have been found to be suitable for polymerizing propylene to solid polymer, most of such catalyst systems give relatively poor yields of solid polymer and in most cases the solid polymer thus obtained contains a large percentage of amorphous material. It has been shown, that the highly crystalline or so-called isotactic or syndotactic higher polyolefins have greatly improved characteristics over the amorphous polyolefins, and it has therefore been desirable to not only find methods whereby the higher $\alpha$-monoolefins could be polymerized to solid polymer at all in commercially feasible yields but also to find methods whereby the polymer thus obtained was largely in the highly crystalline isotactic or syndotactic form. For example, the amorphous or atactic polypropylene which has been formed as a solid by some of the methods known to the art has a melting point of 80° C. and a density of 0.85. In contrast to this, the highly crystalline isotactic solid polypropylene has a melting point of 165° C. and a density of 0.92. Similarly, atactic polybutene-1 has a melting point of 62° C. and a density of 0.87 whereas the isotactic polybutene-1 has a melting point of 128° C. and a density of 0.91. The same increased density and melting point is observed with the other higher $\alpha$-monoolefins in solid polymeric form including both the straight and the branched chain monoolefins. Thus, crystalline poly-3-methylbutene-1 has a melting point in excess of 240° C., crystalline poly-4-methylpentene-1 has a melting point in excess of 205° C., crystalline poly-4-methylhexene-1 has a melting point of about 190° C., crystalline poly-5-methylhexene-1 has a melting point of the order of 130° C. and crystalline poly-4,4-dimethylpentene-1 has a melting point in excess of 300° C. It is thus apparent that the formation of solid higher polyolefins is of considerable importance in the art and particularly methods whereby such solid polyolefins can be prepared in good yield and largely in the highly crystalline form.

It is accordingly an object of this invention to provide new and improved methods whereby the aliphatic $\alpha$-monoolefinic hydrocarbons containing at least 3 carbon atoms can be readily polymerized to high molecular weight polymers and particularly to solid high molecular weight polymers of a very high degree of crystallinity.

Another object of the invention is to provide a catalytic mixture which, unlike closely related mixtures, is highly effective for polymerizing the higher $\alpha$-monoolefins to solid polymer and which possesses an unusual degree of stereospecificity whereby objectionable formation of low molecular weight polymers which are oily or greasy in nature is avoided and whereby the formation of amorphous solid polymers is also largely obviated.

Another object of the invention is to provide a new and improved catalytic mixture for polymerizing higher $\alpha$-monoolefins composed of two specific components which are in themselves wholly inactive for effecting the polymerization and which are inactive in combination until activated as described herein.

Another object of the invention is to facilitate the commercial production of the highly useful solid polyolefins of $\alpha$-monoolefins containing at least 3 carbon atoms whereby hydrocarbon polymers of very high softening points, high tensile characteristics, good moldability, improved stiffness and good film forming properties are readily obtained.

Other objects will be apparent from the description and claims which follow.

These and other objects are attained by means of this invention as described more fully hereinafter with particular reference to certain preferred embodiments thereof.

We have discovered that propylene and the other straight and branched chain aliphatic monoolefins containing at least 3 carbon atoms, either singly or in admixture, can be readily polymerized to high molecular weight solid polymers having unusual crystallinity by effecting the polymerization catalytically using as the catalyst therefor a mixture of lithium metal and titanium polyhalide in a mole ratio of from 0.1:1 to 10:1 provided the catalytic mixture is activated either prior to or during the polymerization by being heated to a temperature of at least 150° C. This activated catalyst mixture is highly effective for polymerizing the $\alpha$-monoolefinic hydrocarbons containing at least 3 carbon atoms and particularly the straight or branched chain aliphatic $\alpha$-monoolefins containing 3–10 carbon atoms such as propylene, butene-1, pentene-1, 3-methylbutene-1, 4-methylpentene-1, 4-methylhexene-1, 5-methylhexene-1, 4,4-dimethylpentene-1, and similar $\alpha$-monoolefins of 3–10 carbon atoms to high molecular weight polymer and particularly to solid highly crystalline polymer in excellent yield by commercially feasible methods.

The reason why the specific catalytic mixtures herein defined consisting of lithium metal and a titanium polyhalide which is desirably either the di-, tri- or tetrachloride or tetrabromide and preferably the tetrachloride, are effective for polymerizing the higher α-monoolefins to solid polymer and particularly to highly crystalline solid polymer is not understood, nor is the mechanism by which the polymerization takes place. The very specific nature of the catalysts is demonstrated by the fact that the lithium metal cannot be replaced by the other well known alkali metals such as sodium or potassium since such other alkali metals are wholly ineffective for giving solid polymer. This is in sharp contrast to the situation encountered in polymerizing ethylene wherein any of the alkali metals can be used in combination with any of a number of titanium compounds to give solid highly crystalline polyethylene as described in detail in our copending application Serial No. 619,671, filed concurrently herewith. Furthermore, the specific nature of the catalyst mixture employed herein is shown by the fact that only the titanium polyhalides will work as the titanium compound and such materials as the titanium tetraalkoxides which ordinarily would be considered to be equivalent are also wholly ineffective for forming solid higher polyolefins when used in conjunction with the lithium metal under the best conditions known for effecting the polymerization. Thus, this invention is concerned solely with the use of combinations of lithium metal and titanium polyhalides, and particularly titanium tetrachloride for polymerizing the higher α-monoolefins. In addition, the improved results which characterize the present invention are obtained only when the catalytic mixture is activated by heating at a temperature of at least 150° C. and particularly at temperatures of 150–250° C. This activation can be carried out by heating the catalyst mixture prior to use in the polymerization system whereby the polymerization itself can be carried out at temperatures as low as 110° C. In most cases, the polymerization itself is desirably carried out at a temperature of at least 150° C. whereby pre-activation of the catalyst in the absence of the monomer is not necessary. This high temperature activation is likewise not understood although it should be noted that many of the catalyst systems known to the art for polymerizing olefins, such as the organoaluminum compounds such as aluminum triethyl when used in combination with a transition metal compound such as titanium tetrachloride, are wholly ineffective for use as catalysts at temperatures above about 110° C. and are completely unsuitable for use at temperatures as high as 150° C. In contrast to this, the catalysts embodying this invention must be activated at temperatures of at least 150° C. and exhibit optimum activity in polymerization reactions carried out at temperatures of at least 110° C. and desirably at least 150° C. with polymerization ranges of 150–250° C. being preferably employed.

The polymerization in accordance with this invention is carried out at somewhat elevated pressures such as pressures of at least 200 p.s.i. In most cases, pressures of 200–5000 p.s.i. are desirably employed, although higher pressures can be used but offer little advantage and are less desirable from the economic standpoint. The pressure in the polymerization system can be achieved in any desired manner but is conveniently achieved by pressuring the system with the monomer or monomers being polymerized.

The polymerization can be carried out in the presence or absence of a solvent vehicle although the polymerization is conveniently carried out in an inert organic liquid vehicle. The polymerization can, however, be carried out in the absence of a liquid vehicle by merely contacting the catalyst at the desired pressure and temperature with the olefin monomer. When the gaseous monomer is compressed so as to give a dense gas in contact with the catalyst or when the monomer employed is normally liquid, the catalyst concentrations required are so low that in many cases it is possible to simply filter the molten polymer stream to obtain a product with a residual ash low enough to be satisfactory for most commercial uses.

The polymerization at elevated temperatures has an additional advantage in that the polymerization can be effected at temperatures near or above the melting point of the polymer being produced without fouling of the catalyst or inactivation of the system. This obviates the difficulty inherent in many of the lower temperature processes wherein the formation of polymer either causes a deposit on the catalyst sufficient to cause inactivation or, when the polymerization is carried out in a solvent medium, the polymerization mixture become too viscous for adequate agitation before the catalyst is exhausted with a resultant loss in the economy of the process and the necessity for removing large amounts of residual catalyst from the resulting polymer.

When the polymerization is carried out in an inert organic liquid vehicle, any of the common inert organic liquids which contain no combined oxygen and which are free of water, alcohol, ether, or other compounds containing oxygen or compounds containing unsaturation can be used. The solvents employed as the vehicle are desirably the hydrocarbons which are liquid at the polymerization temperatures and pressures although the chlorinated hydrocarbons can also be used. Thus, suitable solvents include the aliphatic hydrocarbons such as propane, pentane, heptane and similar alkanes, the aromatic hydrocarbons such as benzene, toluene or xylene, and halogenated hydrocarbons such as trichloroethylene or chlorobenzene. Petroleum fractions of suitable boiling range such as Stoddard solvent, mineral oil, kerosene or gasoline can also be used. Other vehicles which are suitable include the alkylated benzenes, the naphthalenes, decalin, tetralin and the like. When the polymerization is carried out in a liquid vehicle, the concentration of the catalyst in the vehicle can be varied widely, and we have found that excellent results are obtained at catalyst concentrations of from 0.2% to 25% by weight based on the weight of the vehicle. As can be seen, the concentration of catalyst based on the weight of material being polymerized varies even more widely since the monomer being polymerized is usually present in the vehicle in a concentration of from about 2 to about 50% by weight based on the weight of the vehicle. Thus, the concentration of the catalyst based on either the weight of the vehicle used, if any, or on the monomer being polymerized is not critical, and the invention is not limited to any particular concentration. We have found, however, that the mole ratio of the lithium metal and the titanium tetrahalide should be in the range of from 0.1:1 to 10:1 and preferably in the range of 1:1 to 10:1 of lithium to titanium tetrahalide for best results. In general, the lower mole ratios of lithium metal are used when polymerization is carried out at high temperatures, e.g. 190–300° C., or when the catalyst mixture is treated with hydrogen or otherwise reduced prior to contacting the olefin. The larger mole ratios of lithium are used when polymerization is conducted at lower temperatures, e.g. 110–190° C. or when higher molecular weights are desired. When 4 to 6 moles of lithium metal per mole of titanium tetrachloride are used, the optimum polymerization temperature is of the order of 150–160° C. When 2–3 moles of lithium metal per mole of titanium tetrachloride are used, the optimum polymerization temperature is 190–230° C. The very low concentrations of lithium metal can be used when a very high surface dispersion of the lithium metal on an inert support is used as described hereinafter, although the high surface dispersions of lithium metal on an inert support can be used at the higher mole ratios also with excellent results.

The polymerization in accordance with this invention is carried out at pressures of at least 200 p.s.i. and usually 200–5000 p.s.i. for optimum results. Higher olefin pressures result in higher olefin concentrations in the reaction medium and thus serve to increase the rate of polymerization and the molecular weight of the polymer.

The molecular weight, melt index, softening point and other commercially important properties of the higher polyolefins depend upon the polymerization temperature, pressure and on the conversion. High conversions and low temperatures favor the formation of high molecular weight, low melt index polymers, and vice versa. Thus, by adjusting the various variables within the ranges herein described, the properties of the polymers obtained can also be varied depending upon whether the polymer is to be employed for molding applications, coating applications, fiber uses, or extrusion or melt casting into the form of sheets and films.

We have found that particularly active catalyst mixtures are obtained when the lithium metal is employed in the form of a high surface dispersion of the lithium metal on an inert particulate support. These high surface dispersions are readily prepared by slurrying any of the well known inert supports in molten lithium whereby the lithium metal spreads in a thin film over the surface of the support to give a film thickness varying from 1 to 5 atoms. Thus, lithium metal is readily spread in the form of a high surface dispersion at any temperature above the melting point of the lithium metal, and the resulting high surface lithium remains a free-flowing granular catalyst at temperatures up to the boiling point of the metal. Since the boiling point of lithium metal is far above the conditions under which polymerization is effected, the high surface dispersions of lithium are suitable for use under any of the polymerization conditions herein defined. The nature of the granular support is not critical, and any of the well known inert supports can be used, and the lithium metal can be varied in concentration on the support as desired up to the concentration at which the mixture forms a pasty mass. Thus, the lithium can amount to as much as 30% of the total weight of the metal and support, although much lower concentrations are wholly suitable and concentrations of from 10 to 30% of lithium metal based on the combined weight of the metal and support are generally employed. Since the support serves only to give the high surface area of lithium metal, any of the inert granular materials can be used including salts such as sodium chloride or similar salts which are not soluble in hydrocarbons, difficulty reducible metal oxides such as titania, zirconia, alumina and the like, carbon black, silica alumina, clays, and similar well known inert particulate materials upon which the lithium metal can spread in thin film form. When such high surface dispersions of lithium metal are employed, the catalytic mixture, after activation, is particularly active, and low mole ratios of lithium metal to titanium tetrahalide can be most effectively used. The amount of lithium on a particular support will depend upon the nature of the support, and free-flowing dispersions are obtained with about 10% by weight of metal on activated alumina, 25% by weight on activated carbon, 10% by weight on sodium chloride, 10% by weight on zirconium oxide, and about 5% by weight on sand. Thus the high surface dispersions can contain any amount of the lithium metal which will spread over the support being used to give a free-flowing solid. Although the high surface dispersions are preferred because of their enhanced activity, the unsupported lithium metal can be used with excellent results and is within the scope of the invention.

The catalyst mixtures embodying the invention must be activated at a temperature of at least 150° C. in order to be effective for polymerizing the higher olefins to solid crystalline form. When the catalytic mixture is activated before being added to the polymerization system, this is readily accomplished by heating the catalytic mixture to a temperature of at least 150° C. and desirably 190–250° C. for periods of from a few minutes to several hours. If desired, the mixture can be first treated with hydrogen at elevated pressures and temperatures although the treatment with hydrogen is not necessary for good results and the high temperature activation is still necessary in order to achieve catalytic activity. There are several advantages to the high temperature characteristics of the catalysts of this invention. The polymerization is usually facilitated by elevated temperatures for which the present catalyst mixtures are completely suitable. In contrast to this, the organometallic catalysts such as the organoaluminum catalysts are completely inactive at temperatures above about 120° C. and usually above 110° C. For example, ethylaluminum sesquibromide and titanium tetrachloride in admixture are completely unusable in boiling toluene (110° C.) whereas the catalysts of this invention give excellent yields of higher polyolefins at temperatures as high as 250° C. or higher. Because of the high temperature characteristics of the catalysts of this invention, little or no solvent is needed during the polymerization although the use of solvent may be desirable and is within the scope of the invention. Since the process is operable at temperatures well above the melting point of the polymer being formed in many cases, relatively concentrated solutions of the polymer can be handled. Molten polymers as well as highly viscous polymer solutions do not inactivate the catalysts of this invention, and consequently high space-time yields are possible. This is in contrast to the organoaluminum catalysts which are inoperable above the melting point of the polymers whereby slurries of polymer in solvent must be handled. Since the polymers at lower temperatures form very viscous slurries in solvent, polymerization using conventional catalysts is limited to those relatively dilute slurries which can be stirred and pumped. In addition, the catalyst mixtures of this invention are stable and require no special handling techniques. The components of the catalytic mixture are not highly pyrophoric and are not subject to rapid inactivation by air. The superior stability of the present catalyst mixtures to accidental inactivation permits precise control of the catalyst concentration. Furthermore, lithium metal offers important cost advantages over the organoaluminum or similar organometallic compounds as catalyst components. A further advantage of the catalysts embodying this invention is the stereospecific nature of the catalyst mixture whereby highly crystalline polymers are obtained and such solid polymer formation is not accompanied by the concomitant formation of objectionable amounts of oils and greases which usually characterize many of the catalytic processes and particularly those wherein aluminum in combined form is a component.

Although little or no solvent vehicle need be used in effecting the polymerization embodying this invention, the polymerization is conveniently carried out in an inert solvent. Since the use or non-use of a liquid vehicle is not critical to the practice of the invention, the concentration of catalyst and monomer in the solvent can be varied over a wide range. Thus, wholly suitable polymerization is effected at catalyst concentrations of from 0.2% to 25% by weight of the catalyst mixture based on the weight of the solvent, although higher concentrations can be used if the solvent is reduced or dispensed with altogether. For example, the polymerization can be carried out using the monomer in the form of a compressed dense gas or liquid and employing no diluent liquid vehicle. In such cases, the catalyst concentrations required are so low that in many cases it is possible to simply filter the molten polymer to obtain a product with a residual ash low enough to be satisfactory for most commercial uses. Furthermore, the high temperatures which are employed permit the concentration of monomer in the vehicle to be varied widely with concentrations of from about 2 to 50% by weight being wholly operable. The concentration of monomer will depend upon the solubility of the monomer in the vehicle under the temperature and pressure conditions employed and hence can be varied. Concentrations of monomer in the vehicle of about 3–7% by weight are commonly employed, although higher concentrations ordinarily increase the rate of polymerization and are sometimes desirably used. Concentrations above 5–10% by weight are entirely feasible at the high temperatures obtaining in this invention, which is in contrast to the usual polymerization systems wherein a solvent medium is used at lower temperatures since the viscosity of the solutions limits the concentration of the monomer which can be employed.

As has been indicated, the processes embodying the invention can be carried out either batchwise or continuously, and the degree of conversion and the polymerization temperature can be varied whereby such properties of the polymer as the molecular weight, melt index, softening point, and other commercially important properties of the product can be varied. Catalyst can be removed from the polymers by any of several known methods including washing with water, alcohols or alcoholic acid or alkali solutions. The washing of catalyst from the polymer is facilitated by having the polymer in powder form, and suitable powders are obtained by dissolving the crude polymers in a suitable solvent such as xylene isobutanol mixtures, filtering and then cooling. The residual solvent can be removed from the polymer by steam distillation.

The invention is illustrated by the following examples which set out certain preferred embodiments thereof and also contrast the results achieved by means of this invention with the results obtained using closely related catalyst mixtures which do not have the same catalytic activity in polymerizing higher α-monoolefins for reasons which are not apparent. The examples are included only for purposes of illustration and are not intended to limit the scope of the invention unless otherwise specifically indicated.

Example 1

A mixture of 6.4 g. (0.93 atom) of lithium sand and 20.4 ml. (0.185 mole) of titanium tetrachloride in 500 ml. of heptane was charged to a 3-liter stirred autoclave.

The autoclave was then pressured with propylene to a pressure of 1000 p.s.i. and the pressure maintained at 500–1000 p.s.i. for 16 hours at 150° C., the total amount of propylene amounting to 1500 g. The autoclave was then cooled and the polymer discharged, washed with methanolic hydrochloric acid and then filtered and the polypropylene dissolved in 4 liters of a mixture of xylene and isobutanol. The polypropylene was precipitated in the form of a powder by cooling the resultant mixture, and the residual solvent was removed in a steam stripper. After drying, the solid polypropylene obtained weighed 800 g. and had a Vicat softening point of 131° C. The density of the polypropylene was 0.917, and the melt index was 1.0. The polypropylene consisted of approximately 95% crystalline material. This illustrates the high activity of the catalyst mixtures embodying this invention when activated and also illustrates the stereospecific nature of the catalyst since the polymer was almost completely crystalline.

The specific nature of the catalyst is also illustrated by the fact that when the process described was repeated substituting the titanium alkoxide, tetra-2-ethylhexyl titanate for the titanium tetrachloride in the same mole ratio and under the same conditions, no solid polypropylene was obtained. It is thus apparent that the nature of the titanium compound is very critical and, as will appear in subsequent examples, the use of lithium metal is also critical. The attempts to polymerize propylene to solid polymer with a mixture of lithium and titanium alkoxide were carried out at the mole ratio of 5:1 and a temperature of 150° C. which has been found to be the optimum conditions for polymerizing propylene using mixtures of lithium and titanium tetrahalide. We have also found that titanium tetrabromide can be successfully substituted for titanium tetrachloride although with somewhat less efficacious results.

Example 2

The procedure of Example 1 was repeated charging the autoclave with 3.2 g. (0.465 atom) of lithium, 10.2 ml. (0.0925 mole) of titanium tetrachloride and 500 ml. of heptane. The autoclave was heated and stirred at 150° C. and propylene was charged in at 1000 p.s.i. After being worked up as described in the preceding example, the product consisted of 670 g. of highly crystalline polypropylene having a melt index of 0.2. This solid polymer again showed a crystallinity of approximately 95%. The polymer was suitable for various molding and casting operations commonly employed for preparing plastic films, sheets, molded articles, and the like, and also could be melt spun into fibers and yarns of exceptional strength.

The specific nature of the lithium in forming the solid higher olefins is illustrated by the fact that a catalyst mixture composed of 18.2 g. (0.465 atom) of potassium metal, 10.2 ml. (0.0925 mole) of titanium tetrachloride and 500 ml. of heptane was charged to a 3-liter stirred autoclave. The autoclave was heated and stirred at 150° C. while liquid propylene was pumped in until the pressure amounted to 900 p.s.i. The reaction was carried out at this pressure and at 150° C. for 7 hours. No solid polypropylene was formed. The solvent and liquid reaction product was extracted with dilute hydrochloric acid and distilled. There remained 730 ml. of liquid reaction product after all of the heptane solvent had been distilled over. It is thus apparent that potassium cannot be substituted for lithium in forming solid higher polyolefins despite the fact that both are alkali metals which are ordinarily considered to be equivalent. The reason why lithium results in the formation of solid polymer and particularly why lithium is of a stereospecific nature so as to give solid highly crystalline polymer is not understood and was unexpected since this behavior does not parallel the behavior found in polymerizing ethylene.

The non-equivalence of sodium with lithium in the polymerization of the higher olefins was also illustrated by repeating Example 1 using 21.5 g. (0.93 atom) of sodium metal in place of the lithium. At the end of the reaction period, no solid polymer had formed but a considerable amount of liquid buildup in the autoclave was noted. Solvent and reaction product were extracted with dilute hydrochloric acid to remove catalyst residues and heptane solvent was distilled out. The residue of liquid polypropylene amounted to 550 ml.

Example 3

The invention is illustrated by the polymerization of propylene which is at present the most readily available of the higher α-monoolefins and hence is of greatest immediate commercial application. The invention is applicable, however, to any of the other higher α-monoolefins as defined herein, and it has been found that large amounts of solid highly crystalline polyolefin are prepared by polymerizing such diverse materials as butene-1, pentene-1, 3-methylbutene-1, 4-methylpentene-1, 4-methylhexene-1, 5-methylhexene-1, and 4,4-dimethylpentene-1. In a typical polymerization, a 2-liter stirred autoclave was charged with a catalyst mixture of 2.1 g. (0.30 atom) of lithium metal and 6.6 ml. (0.060 mole) of titanium tetrachloride in 500 ml. of toluene. The reaction mixture was stirred and heated at 160° C. Butene-1 was pumped into the autoclave until the pressure was 600 p.s.i. Polymerization was continued for 6 hours at 160° C., and the autoclave was then cooled to about 60° C. and emptied. Additional toluene was added, and the mixture was heated until all of the polymer dissolved. The polybutene solution was filtered under pressure, and the filtrate was cooled to separate the polybutene in powdered form. The powdered polybutene which precipitated out was collected, washed with acetone and with boiling water to give 134 g. of solid polybutene having a melt index of 2.4, a specific gravity of 0.908 and a Vicat softening point of 122.1° C. As in the case of the solid polypropylene, the solid polybutene was highly crystalline in character. When this procedure was repeated with the other higher olefins as described, solid polymer was also achieved of highly crystalline character. In particular, the poly-4,4-dimethylpentene-1 showed an extremely high melting point which was in excess of 300° C. Solid poly-3-methylbutene-1 had a melting point in excess of 250° C. and solid poly-4-methylhexene-1 had a melting point in excess of 180° C. It was found that the polymerization was particularly applicable for polymerizing the straight chain α-olefins containing 3–5 carbon atoms and for polymerizing the branched chain olefins containing 5–10 carbon atoms.

*Example 4*

A stirred autoclave of 3500 ml. capacity was charged with 6.4 g. (0.93 atom) of lithium metal, 35.2 g. (0.185 mole) of titanium tetrachloride and 500 ml. of heptane. The mixture was heated to 150° C. and 1500 ml. of propylene was pumped in. The reaction was continued for 16 hours at 150° C., during which time the pressure fell from 1050 p.s.i. to 400 p.s.i. The reaction product was partially separated from the catalyst residues by washing with a hot solution of hydrochloric acid in methanol. The polypropylene was then further purified by dissolving it in 4 liters of hot xylene, filtered under nitrogen pressure, and reprecipitated by adding 2 liters of isobutanol. The solid polypropylene was then washed with methanol and dried to give 82 g. of material having a melt index of 8, a specific gravity of 0.927 and a Vicat softening point of 131° C.

*Example 5*

A high surface suspension of lithium on gamma alumina was prepared by slurrying together at 210° C. a mixture of 2.56 g. (0.37 atom) of lithium and 25 g. of gamma alumina. The heating was carried out under dry nitrogen while agitating the slurry. As the lithium metal melted, it rapidly spread over the surface of the gamma alumina as evidenced by a change in the color to a dull gray. The resulting high surface dispersion of lithium on the alumina was a free-flowing powder which remained free flowing up to the boiling point of the lithium metal. A solution of 35.2 g. (0.185 mole) of titanium tetrachloride in 500 ml. of heptane was then added to the lithium dispersion, and the entire mixture was transferred to a 3.5-liter stirred autoclave. The mixture was heated to 150° C. and 1500 ml. of propylene was pumped in. The reaction was continued for 5 hours at 150° C. with fresh propylene being pumped in as needed to keep the pressure between 800 and 1000 p.s.i. The polymer was separated from the catalyst by dissolving it in xylene and filtering the hot solution. The polypropylene precipitated from the xylene solution on cooling. It was collected by filtration, washed with acetone and vacuum dried to give 242 g. of highly crystalline solid polypropylene having a melt index of 3.1, a specific gravity of 0.922 and a Vicat softening point of 129.8° C.

*Example 6*

A 2-liter stirred autoclave was charged with a catalyst mixture prepared from 3.5 g. (0.50 atom) lithium metal and 19.0 g. (0.10 mole) of titanium tetrachloride in 500 ml. of isooctane. The autoclave was purged with nitrogen, and the reaction mixture was stirred and heated to 150° C. When the temperature reached 150° C., 400 g. of 3-methyl-1-butene was pumped into the autoclave. Polymerization was carried out at 150° C. for 16 hours. At the end of the reaction, the autoclave was cooled to room temperature, and 500 ml. of methanol was added to decompose the unreacted lithium. The polymer was recovered by filtration and dissolved in 2 liters of xylene. The xylene solution was filtered under nitrogen pressure, and the hot filtrate was diluted with 1 liter of hot isobutanol. The polymer separated on cooling and was collected by filtration and washed thoroughly with methanol. The poly-3-methyl-1-butene thus obtained weighed 82 g., had a melting point of 200–220° C. and a specific gravity of 0.895.

Thus by means of this invention certain specific catalyst mixtures are provided which, when activated as described hereinabove, are highly active for polymerizing the higher α-monoolefins containing at least 3 carbon atoms and which are unique in forming solid polymer of highly crystalline character. The components of the catalyst mixture are readily available materials which are easily handled in commercial operations, and the polymerizations embodying the invention are readily adapted to commercial scale production. The polymers which are obtained in accordance with the invention can be used for forming films, sheeting, fibers, molded articles, coating articles, and the like, and the polymers can be blended with other plastic materials or compounded with the usual pigments, dyes, fillers, stabilizers, and the like. The process of the invention is equally applicable for forming copolymers of two or more of the higher α-monoolefins as defined, and a great variety of products can be readily obtained by varying the relative proportions of the components of the mixture of monomers being polymerized.

The invention has been described in detail with particular reference to certain preferred embodiments thereof, but it will be understood that variations and modifications can be effected within the spirit and scope of the invention as described hereinabove and as defined in the appended claims.

We claim:

1. In the polymerization of an α-monoolefinic aliphatic hydrocarbon containing 3–10 carbon atoms, the improvement which comprises effecting the polymerization at a temperature of at least 110° C. and a pressure of at least 200 p.s.i. by catalysis with an activated catalytic mixture of lithium metal and titanium polyhalide selected from the group consisting of Ti Cl$_4$ Ti Cl$_3$ and Ti Cl$_2$ in a mole ratio of from 0.1:1 to 10:1, said catalytic mixture being activated by heating at a temperature of 150–250° C.

2. The method of polymerizing hydrocarbon material consisting of at least one α-monoolefinic aliphatic hydrocarbon containing 3–10 carbon atoms which comprises heating said hydrocarbon material at 110°–250° C. and a pressure of at least 200 p.s.i. in the presence of an activated catalyst mixture of lithium metal and titanium tetrachloride, the mole ratio of said lithium metal to said titanium tetrachloride being in the range of from 0.1:1 to 10:1, said catalytic mixture being activated by heating at a temperature of 150°–250° C.

3. The method of polymerizing hydrocarbon material consisting of at least one α-monoolefinic aliphatic hydrocarbon containing 3–10 carbon atoms which comprises heating said hydrocarbon material at a temperature of 150°–250° C. and a pressure of at least 200 p.s.i. in the presence of a catalytic mixture of lithium metal and titanium tetrachloride in a mole ratio of from 0.1:1 to 10:1.

4. The method of polymerizing hydrocarbon material consisting of at least one α-monoolefinic aliphatic hydrocarbon containing 3–10 carbon atoms which comprises heating said hydrocarbon material at 150–250° C. and 200–5000 p.s.i. in the presence of a catalytic mixture of lithium metal and titanium tetrachloride in a mole ratio of lithium to titanium tetrachloride of from 0.1:1 to 10:1, said lithium metal being in the form of a high surface dispersion on an inert support.

5. The method of polymerizing propylene to form solid highly crystalline polypropylene which comprises heating propylene at a temperature of 150–250° C. and a pressure of 200–5000 p.s.i. in the presence of a catalytic mixture of lithium metal and titanium tetrachloride in a mole ratio of from 1:1 to 10:1.

6. The method of polymerizing butene-1 to form solid highly crystalline polybutene which comprises heating butene-1 at a temperature of 150–250° C. and a pressure of 200–5000 p.s.i. in the presence of a catalytic mixture of lithium metal and titanium tetrachloride in a mole ratio of from 1:1 to 10:1.

7. The method of polymerizing 3-methylbutene-1 to form solid highly crystalline poly-3-methylbutene-1 which comprises heating 3-methylbutene-1 at a temperature of 150–250° C. and a pressure of 200–5000 p.s.i. in the presence of a catalytic mixture of lithium metal and titanium tetrachloride in a mole ratio of from 1:1 to 10:1.

8. The method of polymerizing propylene to form solid highly crystalline polypropylene which comprises heating propylene at a temperature of 150–250° C. and a pressure of 200–5000 p.s.i. in the presence of a catalytic mixture of lithium metal and titanium tetrachloride in a mole ratio of from 1:1 to 10:1, said lithium metal being in the form of a free-flowing high surface dispersion of lithium metal on an inert particulate support.

9. The method of polymerizing propylene to form solid highly crystalline polypropylene which comprises heating propylene at a temperature of 150–250° C. and a pressure of 200–5000 p.s.i. in an inert liquid hydrocarbon vehicle containing a catalytic mixture of lithium metal and titanium tetrachloride in a mole ratio of about 5:1.

10. The method of polymerizing propylene to form solid highly crystalline polypropylene which comprises heating propylene at a temperature of 150–250° C. and a pressure of 200–5000 p.s.i. in an inert liquid hydrocarbon vehicle containing a catalytic mixture of lithium metal and titanium tetrachloride in a mole ratio of from 1:1 to 10:1, said lithium metal being in the form of a free-flowing high surface dispersion on gamma alumina.

References Cited in the file of this patent

UNITED STATES PATENTS

| | | |
|---|---|---|
| 2,424,083 | Finch et al. | July 15, 1957 |

FOREIGN PATENTS

| | | |
|---|---|---|
| 538,782 | Belgium | Dec. 6, 1955 |
| 538,762 | Belgium | Dec. 6, 1955 |